(12) United States Patent
Fu

(10) Patent No.: US 8,971,052 B2
(45) Date of Patent: Mar. 3, 2015

(54) FIXING APPARATUS FOR EXPANSION CARD

(75) Inventor: Li-Ren Fu, Shenzhen (CN)

(73) Assignee: Zhongshan Innocloud Intellectual Property Services Co., Ltd., Guangdong (CN)

( * ) Notice: Subject to any disclaimer, the term of this patent is extended or adjusted under 35 U.S.C. 154(b) by 183 days.

(21) Appl. No.: 13/564,737

(22) Filed: Aug. 2, 2012

(65) Prior Publication Data

US 2013/0258629 A1    Oct. 3, 2013

(30) Foreign Application Priority Data

Apr. 3, 2012  (CN) .......................... 2012 1 0095723

(51) Int. Cl.
*H05K 5/00*    (2006.01)

(52) U.S. Cl.
USPC .............. 361/755; 361/679.32; 361/679.33; 361/679.37; 361/679.41

(58) Field of Classification Search
CPC ..................................................... G06F 1/185
USPC .................. 361/755, 679.32, 679.33, 679.37, 361/679.41, 752, 753, 759; 710/300, 301, 710/302
See application file for complete search history.

(56) References Cited

U.S. PATENT DOCUMENTS

| | | | |
|---|---|---|---|
| 6,771,510 B1* | 8/2004 | Novak et al. ................... | 361/727 |
| 7,990,736 B2* | 8/2011 | Chen et al. ..................... | 361/802 |
| 8,665,587 B2* | 3/2014 | Peng et al. ............... | 361/679.32 |
| 2013/0058054 A1* | 3/2013 | Zhou ............................. | 361/748 |

* cited by examiner

*Primary Examiner* — Jayprakash N Gandhi
*Assistant Examiner* — Mandeep Buttar
(74) *Attorney, Agent, or Firm* — Novak, Druce Connolly Bove + Quigg LLP

(57) ABSTRACT

A fixing apparatus is used to parallel mount an expansion card to a motherboard. The fixing apparatus includes a mounting bracket fixed to the motherboard, and a retaining member rotatably connected to the mounting bracket. The mounting bracket includes a supporting board supporting the expansion card. The retaining member includes an abutting arm and a locking portion. When the retaining member is rotated to a locking position, the abutting arm abuts against a top of the expansion card to sandwich the expansion card with the supporting board, and the locking portion engages with the mounting bracket to prevent a rotation of the retaining member. When the retaining member is rotated to a releasing position, the abutting arm will move away from the expansion card.

12 Claims, 4 Drawing Sheets

FIXING APPARATUS FOR EXPANSION CARD

BACKGROUND

1. Technical Field

The present disclosure relates to an apparatus for fixing an expansion card.

2. Description of Related Art

For an expansion card mounted in a chassis, a first end of the expansion card is usually fixed to the chassis while a second end of the expansion card is cantilevered. As a result, since the expansion card is long and horizontally fixed to the chassis, the second end of the expansion card may sag and contact an electronic unit, possibly forming a short circuit.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
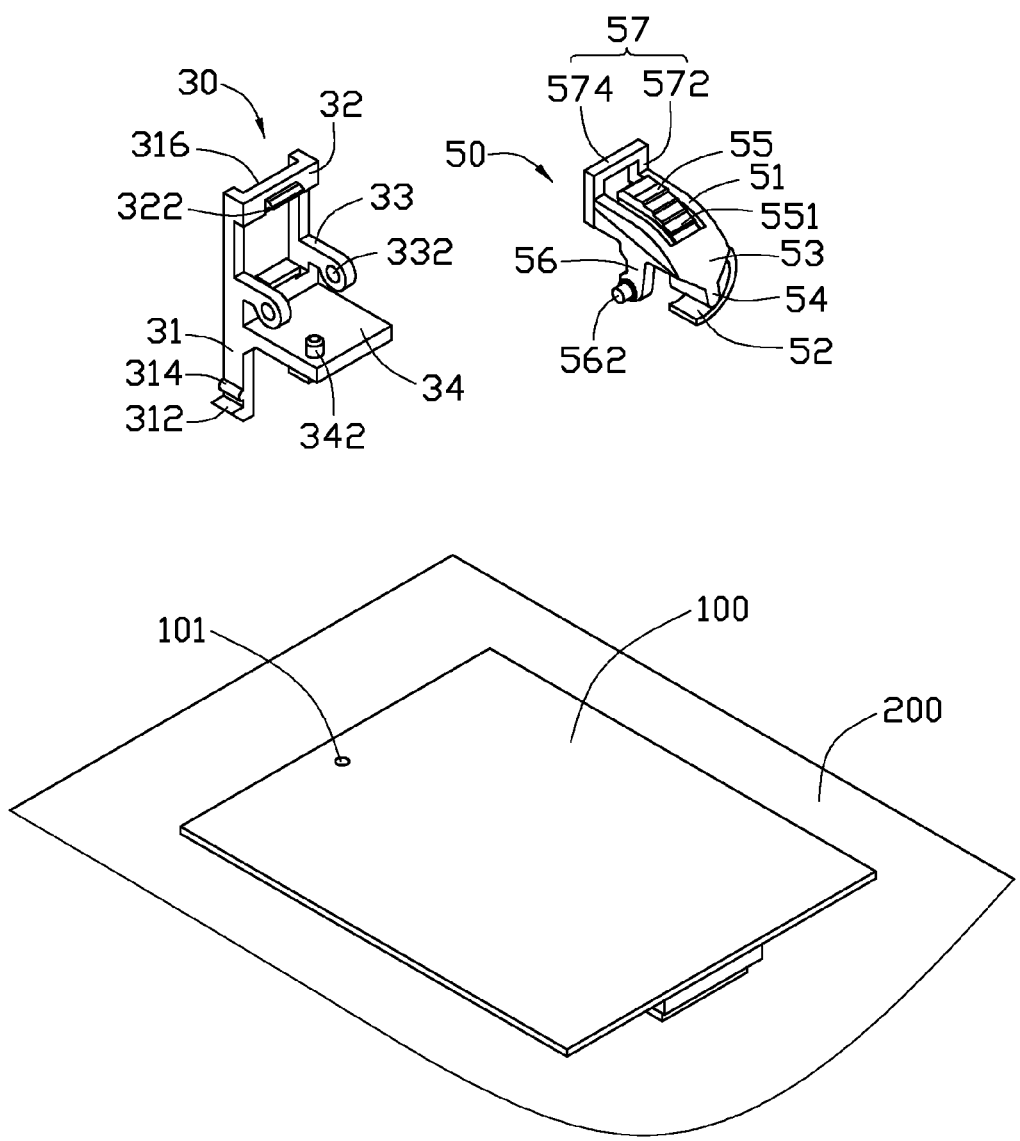
FIGS. 1 and 2 are exploded, isometric views of an exemplary embodiment of a fixing apparatus, together with a motherboard, and an expansion card, in different perspectives.
Figure 2:
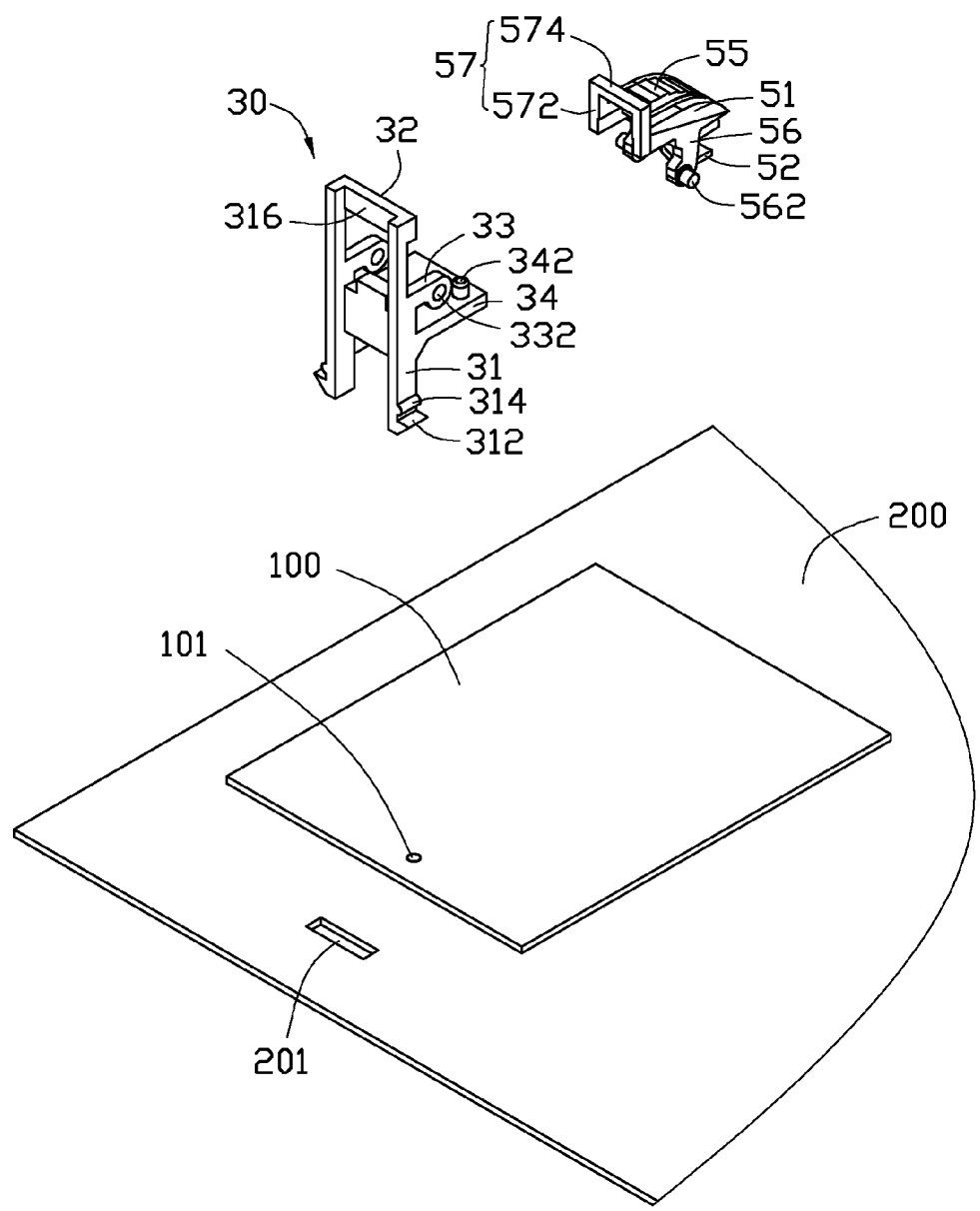

Referring to FIGS. 1 and 2, an exemplary embodiment of a fixing apparatus is used to parallel mount an expansion card 100 to a motherboard 200. The fixing apparatus includes a mounting bracket 30 and a retaining member 50. In one embodiment, a positioning hole 101 is defined in the expansion card 100 adjacent to a rear end of the expansion card 100. The motherboard 200 is horizontally oriented and defines an elongated through hole 201.

The mounting bracket 30 includes two parallel supporting poles 31, a beam 32 connected between front sides of the supporting poles 31 and adjacent to top ends of the supporting poles 31, two connecting arms 33 perpendicularly extending forward from middles of the supporting poles 31, and a supporting board 34 extending forward from the supporting poles 31 and below the connecting arms 33. The supporting board 34 is parallel to the connecting arms 33. A hook 312 and a stop tab 314 protrude from a side of each of the supporting poles 31 opposite to the other supporting pole 31. The hooks 312 are adjacent to bottom ends of the corresponding supporting poles 31. The stop tabs 314 are above and adjacent to the corresponding hooks 312. A receiving space 316 is bounded by the beam 32 and the supporting poles 31. A substantially wedge-shaped protrusion 322 protrudes from a front side of the beam 32. Each of the connecting arms 33 defines a pivot hole 332 adjacent to a distal end of the connecting arm 33. A positioning pin 342 extends up from a top of the supporting board 34.

The retaining member 50 includes two parallel sidewalls 51, an arc-shaped and cantilevered abutting arm 52 extending from a front end of one of the sidewalls 51 towards the other sidewall 51, a connecting wall 53 connected between the sidewalls 51, a blocking portion 54 extending from a front end of the connecting wall 53 towards the abutting arm 52, a cantilevered locking portion 55 extending from a rear end of the connecting wall 53 between the sidewalls 51, two pivoting arms 56 respectively extending from bottom sides of the sidewalls 51, and a manipulation portion 57 connected between rear ends of the sidewalls 51. The locking portion 55 includes a convex top surface defining a plurality of antiskid grooves 551. A shaft 562 extends from an outside of each of the pivoting arms 56, adjacent to a bottom of the pivoting arm 56. The manipulation portion 57 includes two first poles 572 respectively extending up from the sidewalls 51 and a second pole 574 connected between top ends of the first poles 572.

Figure 3:
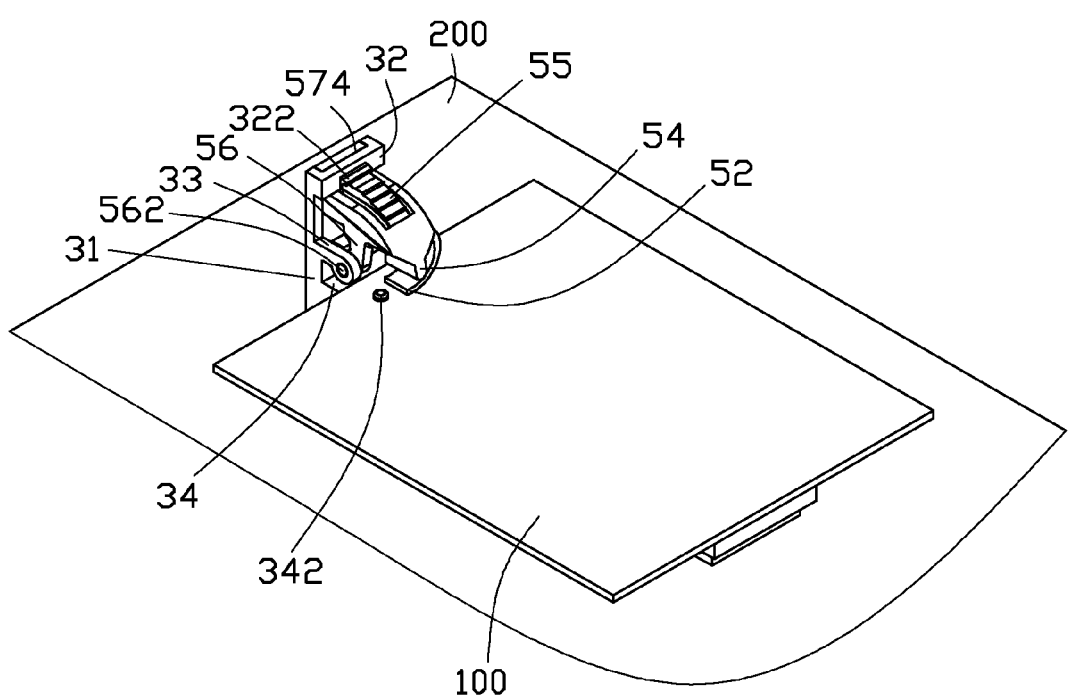
FIGS. 3 and 4 are assembled views of FIG. 1, respectively showing the expansion card locked and released by the fixing apparatus.
Figure 4:
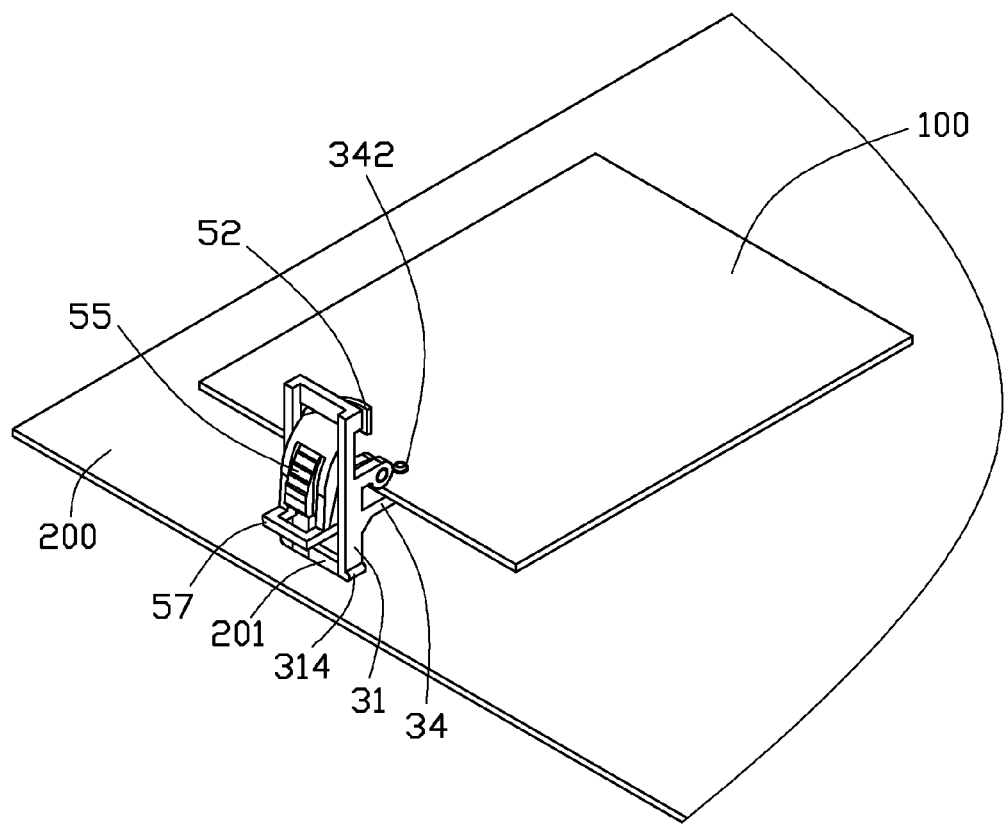

Referring to FIG. 3, in assembly, the hooks 312 of the supporting poles 31 of the mounting bracket 30 extend through the through hole 201 of the motherboard 200. The motherboard 200 is sandwiched between the hooks 312 and the stop tabs 314 of the supporting poles 31 to fix the mounting bracket 30 to the motherboard 200. The sidewalls 51 of the retaining member 50 are placed between the supporting poles 31 of the mounting bracket 30. The manipulation portion 57 is arranged behind the beam 32 of the mounting bracket 30. The shafts 562 of the pivoting arms 56 are rotatably received in the pivot holes 332 to rotatably connect the retaining member 50 to the mounting bracket 30. The retaining member 50 is rotated to a releasing position where the abutting arm 52 of the retaining member 50 is separated from the supporting board 34 to enable the expansion board 100 to be placed onto or moved away from the supporting board 34 without interfering with the abutting arm 52.

To mount the expansion card 100 to the motherboard 200, a front end of the expansion card 100 is electrically connected to the motherboard 200. The rear end of the expansion card 100 is supported on the supporting board 34. The positioning pin 342 extends through the positioning hole 101. The manipulation portion 57 is manipulated to rotate the retaining member 50 to a locking position where the abutting arm 52 abuts against a top of the expansion card 100 to fix the expansion card 100 between the abutting arm 52 and the supporting board 34. The blocking portion prevents over-deformation of the abutting arm 52. At the same time, the second pole 574 of the manipulation portion 57 is received in the receiving space 316 and abuts against a backside of the beam 32. The protrusion 322 engages with a top of the locking portion 55 to prevent the retaining member 50 from inadvertently rotating and releasing the expansion card 100.

To detach the expansion card 100 from the motherboard 200, the retaining member 50 is rotated to the releasing position. Therefore, the expansion card 100 can be moved upwards away from the supporting board 34 with the positioning pin 342 disengaging from the positioning hole 101.

It is believed that the present embodiments and their advantages will be understood from the foregoing description, and they will be apparent that various changes may be made thereto without departing from the spirit and scope of the description or sacrificing all of their material advantages, the examples hereinbefore described merely being exemplary embodiments.

What is claimed is:

1. A fixing apparatus for fixing an expansion card to a motherboard, the fixing apparatus comprising:
 a mounting bracket secured to the motherboard, and comprising a supporting board parallel to the motherboard and supporting the expansion card; and
 a retaining member connected to the mounting bracket, and comprising an abutting arm, wherein the retaining member is rotatable relative to the mounting bracket between a locking position, where the abutting arm abutting against a top of the expansion card to sandwich the expansion card between the abutting arm and the supporting board, and a releasing position, where the abutting arm is separated from the expansion card;
 wherein the mounting bracket comprises two supporting poles perpendicularly secured to the motherboard, the retaining member further comprises two parallel sidewalls, a connecting wall connected between the sidewalls, a locking portion extending from a rear end of the connecting wall between the sidewalls, the mounting bracket further comprises a beam connected between the supporting poles, adjacent to top ends of the supporting poles, and a protrusion protrudes from the beam and detachably engages with the locking portion of the retaining member in the locking position.

2. The fixing apparatus of claim 1, wherein the mounting bracket comprises a positioning pin extending up from the supporting board and detachably engaging in the expansion card.

3. The fixing apparatus of claim 1, wherein the mounting bracket comprises two connecting arms respectively extending forwards from the supporting poles, the supporting board is connected between the supporting poles and below the connecting arms, and the retaining member is rotatably connected between the connecting arms.

4. The fixing apparatus of claim 3, wherein each of the connecting arms defines a pivot hole, the retaining member further comprises two pivoting arms, each pivoting arm comprising a shaft rotatably received in the pivot hole of a corresponding one of the connecting arms.

5. The fixing apparatus of claim 4, wherein the abutting arm extends from a front end of one of the sidewalls towards the other sidewall, the pivoting arms respectively extend from bottom sides of the sidewalls.

6. The fixing apparatus of claim 1, wherein the locking portion is cantilevered, and comprises a convex top surface defining a plurality of antiskid grooves.

7. The fixing apparatus of claim 1, wherein the retaining member further comprises a blocking portion extending from a front end of the connecting wall towards the abutting arm.

8. An assembly, comprising:
 a motherboard;
 an expansion card parallel mounted to the motherboard;
 a mounting bracket secured to the motherboard, and comprising a supporting board parallel to the motherboard and supporting the expansion card; and
 a retaining member connected to the mounting bracket, and comprising an abutting arm, wherein the retaining member is rotatable relative to the mounting bracket between a locking portion, where the abutting arm abuts against a top of the expansion card to sandwich the expansion card between the abutting arm and the supporting board, and a releasing position, where the abutting arm is separated from the expansion card;
 wherein the mounting bracket comprises two supporting poles perpendicularly secured to the motherboard, the retaining member further comprises two parallel sidewalls, a connecting wall connected between the sidewalls, a locking portion extending from a rear end of the connecting wall between the sidewalls, the mounting bracket further comprises a beam connected between the supporting poles, adjacent to top ends of the supporting poles, and a protrusion protrudes from the beam and detachably engages with the locking portion of the retaining member in the locking position.

9. The assembly of claim 8, wherein the expansion card defines a positioning hole, the mounting bracket comprises a positioning pin extending up from the supporting board, the positioning pin is detachably engaged in the positioning hole of the expansion card.

10. The assembly of claim 8, wherein the motherboard defines an elongated through hole, each supporting pole comprises a hook and a stop tab adjacent to a bottom end of the supporting pole, and the hooks of the supporting poles extend through the through hole of the motherboard and sandwich the motherboard with the stop tabs of the supporting poles.

11. The assembly of claim 10, wherein the supporting board is connected between the supporting poles, the mounting bracket further comprises two connecting arms respectively extending forwards from the supporting poles above the supporting board, the retaining member comprises two pivot arms rotatably connected to the corresponding connecting arms of the mounting bracket.

12. The assembly of claim 10, wherein the abutting arm is arc-shaped and extends from a front end of one of the sidewalls towards the other sidewall, and the pivoting arms respectively extend from bottom sides of the sidewalls.

* * * * *